United States Patent [19]
Hirabayashi

[11] Patent Number: 5,211,515
[45] Date of Patent: May 18, 1993

[54] AUTOMATIC MOUNTING AND DISMOUNTING APPARATUS OF ATTACHMENTS

[75] Inventor: Katsumi Hirabayashi, Shizuoka, Japan

[73] Assignee: Toshiba Kikai Kabushiki Kaisha, Tokyo, Japan

[21] Appl. No.: 848,392

[22] Filed: Mar. 9, 1992

[30] Foreign Application Priority Data

Mar. 11, 1991 [JP] Japan ............................ 3-21309

[51] Int. Cl.$^5$ .............................................. B23C 1/02
[52] U.S. Cl. ............................... 409/230; 409/144
[58] Field of Search ............... 409/144, 215, 230, 233; 279/2.04, 2.09

[56] References Cited

U.S. PATENT DOCUMENTS

| | | | |
|---|---|---|---|
| 3,678,801 | 7/1972 | Hague et al. | 409/233 |
| 3,757,637 | 9/1973 | Eich et al. | 409/230 |
| 4,614,468 | 9/1986 | Waldrich et al. | 409/230 X |
| 4,614,470 | 9/1986 | Mitsuharu et al. | 409/230 |

Primary Examiner—Z. R. Bilinsky
Attorney, Agent, or Firm—Cushman, Darby & Cushman

[57] ABSTRACT

An automatic mounting and dismounting apparatus for mounting an attachment onto a spindle head, or ram, of a machine tool. The attachment is provided with a plurality of a stepped openings. A plurality of through openings, corresponding to the stepped openings, are provided on an end surface of the spindle head or ram. A collet that is radially expandable and shrinkable is arranged to be freely shifted in the axial direction of the through opening. The collet includes slits on the periphery. A stationary guide member is located at a position near the entrance of each of the through openings.

1 Claim, 2 Drawing Sheets

AUTOMATIC MOUNTING AND DISMOUNTING APPARATUS OF ATTACHMENTS

BACKGROUND OF THE INVENTION

The present invention relates to automatic mounting and dismounting apparatus of attachments.

Various apparatus for automatically mounting and dismounting an attachment to and from a spindle head having a rotatable spindle, or to and from the end surface of a ram have been proposed. Among these prior art apparatus is a clamping device which clamps the attachment through a collet as disclosed in the Japanese Laid Open Patent Specification No. 85839 of 1985. A clamping rod contacting the inner side of the collet is shifted, at the time of expanding the collet, so as to increase the diameter of the collet in a stepped opening of the collet to withdraw the collet toward a ram. At the time of unclamping, the clamping rod is shifted, or the diameter of the collet is reduced, thereby effecting the automatic mounting and dismounting of the attachment.

A problem associated with the device disclosed in the Laid Open Japanese Patent Specification, described above, is that it is of the type in which when the clamping rod is shifted, it is necessary to provide a clamping rod shifting mechanism. Therefore, the construction of the automatic mounting and dismounting apparatus is complicated.

SUMMARY OF THE INVENTION

Accordingly, it is an object of the present invention to provide a novel attachment mounting and dismounting apparatus capable of automatically mounting and dismounting the attachment. The attachment having a plurality of stepped openings for mounting and dismounting onto and from a spindle head, or ram, of a machine tool having a rotatable spindle.

Another object of the present invention is to provide a novel apparatus for automatically mounting and dismounting an attachment on a spindle head, or a ram, of a machine tool having a rotatable spindle. The apparatus having a simpler and less expensive construction than those of the prior art apparatus.

According to the present invention there is provided an automatic mounting and dismounting apparatus for mounting an attachment having a plurality of stepped openings of its end surface onto a spindle head, or ram, of a machine tool having a rotatable spindle. There are a plurality of through openings, corresponding to a plurality of stepped openings, provided for the attachment at an end surface of the spindle head or ram. A collet is radially expandable and shrinkable, the collet is axially movable with respect to the through openings and is provided with a plurality of circumferentially spaced slits. A hydraulic pressure cylinder axially moves the collet. A stationary guide member is positioned near the entrance of each of the through openings.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings all of which form a part of this specification, wherein like reference numerals designate corresponding parts in the various figures.

DESCRIPTION OF THE PREFERRED EMBODIMENT

Figure 1:
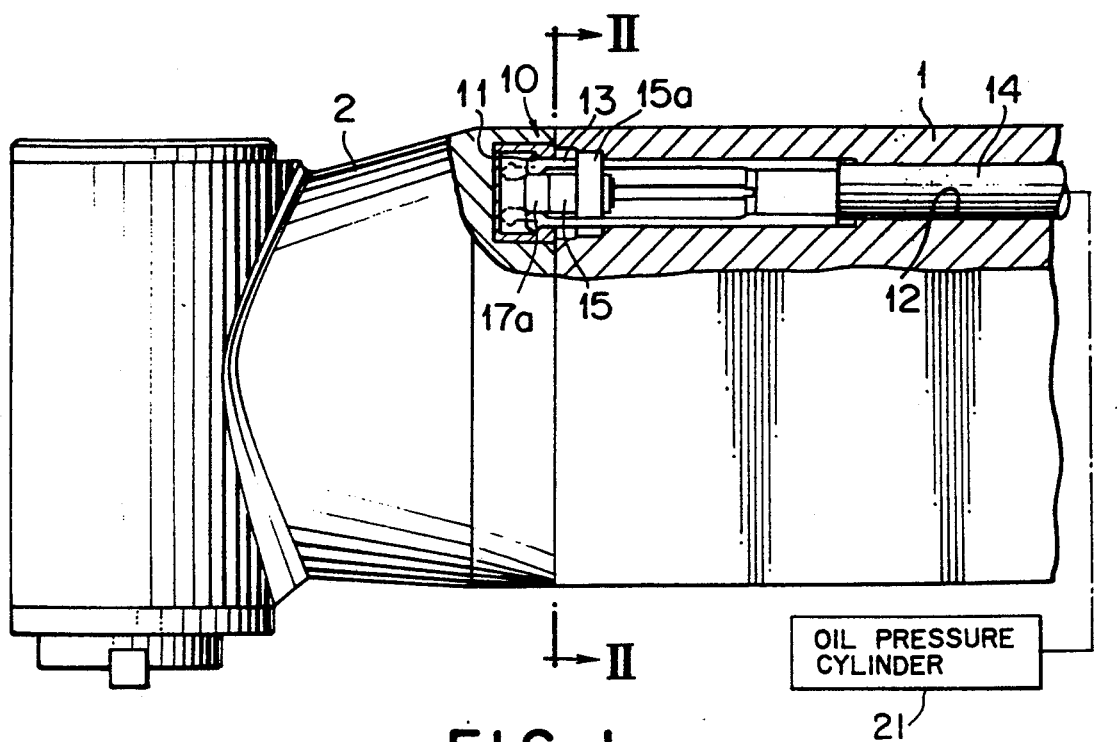
FIG. 1 is a side view, partly in section, of the automatic mounting and dismounting apparatus of an attachment constructed in accordance with the present invention.
Figure 2:
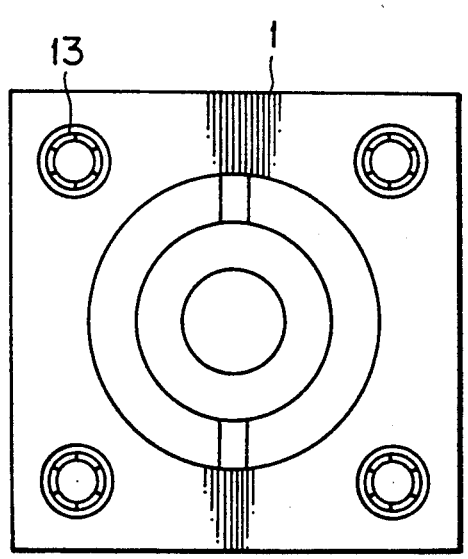
FIG. 2 is a cross-sectional view taken along a line II—II in FIG. 1.
Figure 3:
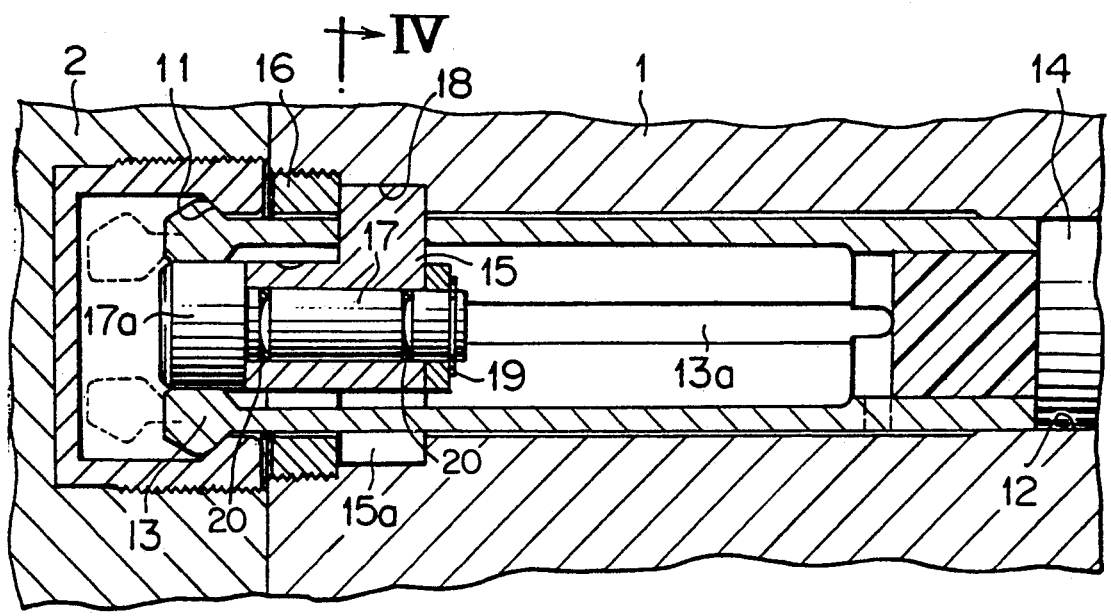
FIG. 3 is an enlarged transversal sectional view showing the automatic mounting and dismounting apparatus shown in FIG. 1.
Figure 4:
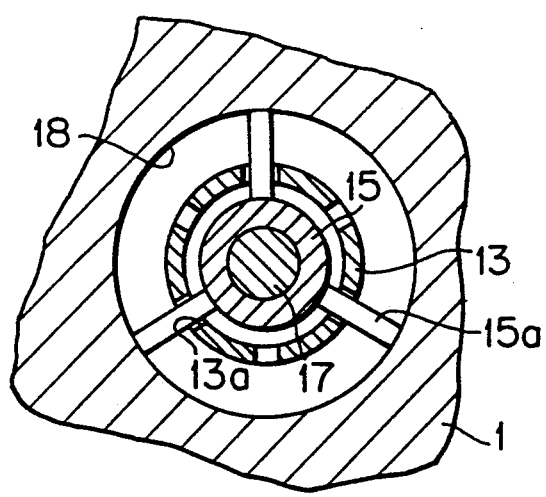
FIG. 4 is cross-sectional view taken along a line IV—IV in FIG. 3.

A preferred embodiment of the present invention will now be described in detail with reference to the accompanying drawings. As shown in FIG. 1, an attachment 2 is mounted on one end of the ram 1 of a machine tool having a rotatable spindle, through an automatic mounting and dismounting apparatus 10 according to the present invention. As shown in FIGS. 1 and 2 at four corners of the attachment 2 are formed stepped openings 11. Corresponding to these openings 11, through openings 12 are formed at the four corners of the end surface of ram 1. As shown in FIGS. 3 and 4, three radial vanes (supporting member) 15a which are equally spaced in the circumferential direction are secured to a ring shaped stationary guide 15 on a side opposite to the collet 13. A guide pin 17 which is provided with an expanded guide head 17a at the front end thereof is inserted into the guide 15, and secured by using a fastening device 19.

Near the inlet end of through opening 12 is a collet 13 which is arranged to move freely in the axial direction, is free to expand and shrink in the radial direction and is provided with a plurality of circumferentially spaced slits 13a. The collet 13 is coupled with a rod 14 which is driven in the axial direction by an oil pressure cylinder 21. Furthermore, the guide 15 is secured to a position near the entrance of the through opening 12 by using the three radial vanes 15a which penetrate freely through the slits 13a and are fitted into an opening 18 at the front end of the through opening 12. The fore end of the stationary guide 15 is limited by a clamping nut 16 which is threaded in an opening of the ram 1.

As shown in FIG. 3, the outer diameter of the guide pin 17 is slightly smaller than the inner diameter of the guide 15, and an elastically deformable O-ring 20 is fitted to the outer periphery of the guide pin 17. The maximum outer diameter of this O-ring 20 is slightly larger than the outer diameter of the guide pin 17, and two of the O-rings 20 are fitted, one each before and after the guide pin 17.

In this manner, the O-ring 20 is arranged between the guide 15 and the guide pin 17 so that the guide pin 17 is arranged inside the guide 15 in a manner such that it is elastically supported by the O-ring 20.

Accordingly, when there is an error in the direction of the radius between the collet 13 and the opening 11 on the side of the attachment 2, the guide pin 17 elastically deforms in the direction of the radius and thus, absorbs this error. By this construction, it is possible for the engagement and disengagement of the opening 11 and collet 13 to be smoothly performed, and for the attachment 2 to be accurately mounted to the end surface of the ram 1.

The automatic mounting and dismounting apparatus of the attachment embodying the present invention described above operates as follows. At the time of clamping the attachment 2, the collet 13 is axially moved along supporting members 15a, which are freely fitted in the slits 13a of the collet 13, so that the front end of the collet 13 is inserted into the stepped opening 11 on the side of attachment 2 while the fore end of the collet 13 is being shrunk. When the collet 13 is driven again toward ram 1, the diameter of the collet 13 is expanded by riding on the stationary guide head 17a, so that the stepped opening 11 is clamped by the collet 13. At the time of unclamping, the collet 13 is again moved into the stepped opening 11, for automatically shrinking the diameter of the collet 13, so as to permit removal of the attachment 2 from the ram 1.

When the attachment 2 is not mounted, a ram cover, not shown, is mounted. When a stepped opening similar to that described above is provided, the mounting of the ram cover becomes easy. Mounting of the ram cover on the end surface of the ram is made by an operation similar to the operation described above.

According to the above described invention, the construction of the automatic mounting and dismounting apparatus can be simplified and its operation becomes easier.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An automatic mounting and dismounting apparatus for mounting an attachment onto a spindle hear or ram of a machine tool comprising:
    (a) the attachment including a plurality of stepped openings at an end surface of said attachment;
    (b) a means for defining a plurality of through openings, the through openings corresponding to the plurality of stepped openings;
    (c) a collet, radially expandable and shrinkable, inserted in each of said through openings the collet being axially movable with respect to the through openings and being provided with a plurality of circumferentially spaced slits;
    (d) a means for axially moving said collet;
    (e) a stationary guide member positioned near the entrance of each of the through openings, the stationary guide member including a ring-shaped stationary guide and a guide pin, the guide pin having an expanded guide head at a front end thereof, the guide pin being inserted into said ring-shaped stationary guide, the ring-shaped stationary guide having a plurality of radial vanes which penetrate freely through the slits of the collet; and
    (f) a resilient supporting means for resiliently supporting the guide pin, the resilient supporting means being between an outer periphery of the guide pin and an inner periphery of the stationary guide member.

* * * * *